May 23, 1967  G. E. BRYNN  3,321,238
CONVERTIBLE VEHICLE BODY
Filed Aug. 23, 1965  3 Sheets-Sheet 1

INVENTOR.
Gerald E. Brynn
BY
W. S. Pettigrew
ATTORNEY

May 23, 1967 G. E. BRYNN 3,321,238
CONVERTIBLE VEHICLE BODY
Filed Aug. 23, 1965 3 Sheets-Sheet 3

INVENTOR.
Gerald E. Brynn
BY
W. S. Pettigrew
ATTORNEY

United States Patent Office 3,321,238
Patented May 23, 1967

3,321,238
CONVERTIBLE VEHICLE BODY
Gerald E. Brynn, Farmington, Mich., assignor to General Motors Corporation, Detroit, Mich., a corporation of Delaware
Filed Aug. 23, 1965, Ser. No. 481,645
6 Claims. (Cl. 296—117)

This invention relates to convertible vehicle bodies and more particularly to a new and improved folding top frame structure for convertible vehicle bodies.

Folding top frame structures for convertible vehicle bodies conventionally include a pair of longitudinally extending side rails each located to a respective side of the body and including a series of end to end swingably connected rail sections longitudinally foldable into stacked relation as the folding top moves between raised and lowered positions. Past convertible vehicle bodies using such frames have been styled with generally straight or slab-sided contours, and the side rails are consequently readily adapted to swing or fold completely within generally vertically disposed longitudinally directed planes of the body. It is further conventional to conserve longitudinal space within the body by having the side rails fold toward lowered position into side or wing portions of the top receiving well which flank the rear seat back of the body and extend somewhat forwardly thereof.

The recent change in convertible vehicle body styling toward a more rounded or curve-sided appearance have created problems with respect to these prior folding top frames. Specifically, such contours are partially derived by curving the side window glass of the body inwardly thereof from bottom edge to top edge. Similarly, the windshield pillars are canted rearwardly and inwardly of the body and result in a relatively narrow windshield header. Consequently, the width of the folding top frame, when in the raised position thereof, is markedly reduced over prior folding top frames, particularly in those areas adjacent the windshield header and the side glass. It is the natural further consequence that, in order to maintain the conventional folding movement of the side rails in vertical longitudinal planes of the body, the top receiving well wing portions must be enlarged inwardly from the side of the body to receive the narrow portions of the folding top frame. This results in a narrowing of the rear seat back to an undesirable extent.

The folding top frame structure of this invention obviates these difficulties and includes a pair of transversely spaced side rails each including rear, intermediate, and front rail sections end to end swingably connected together. The forward ends of the front rail sections have connected thereto respective ends of a transverse forward header member of a narrow width conforming to that of the narrow windshield header. The rear rail sections are swingably mounted on the body and are curved inwardly above the belt line thereof to conform to the inward curvature of the rear quarter side glass. The intermediate and front rail sections are narrowly transversely spaced and extended generally parallel to the sides of the body, and are connected by pivot means having an axis directed transverse of the body. The pivot connection between each rear and intermediate rail section, however, has an axis extending at angles inwardly rearwardly and downwardly of the body when the frame is raised. By this arrangement, rearward swinging movement of the rear rails causes relative folding movement of the front and intermediate rail sections relative thereto in conventional manner, but causes these narrowly spaced rail sections to be moved outboard of the body as the folding top swings from raised to lowered positions. Thus, the portions of the frame which are received in the side or wing portions of the folding top well are located at positions outboard of the plane in which they are located when in raised position, thereby to allow for a rear seat back of maximum width.

One object of this invention is to provide a new and improved folding top frame structure for a convertible vehicle body. Another object of this invention is to provide a folding top frame structure including a pair of rail sections pivotally connected together by means which are operative to swing one of the rail sections outboard of the body as the folding top folds from the raised to the lowered position thereof. A further object of this invention is to provide a folding top frame structure including a pair of side rail sections pivotally connected together by means having an axis disposed at a predetermined compound angle to a normal to a generally vertically disposed plane directed longitudinally of the body. Still another object of this invention is to provide a folding top frame structure including rear, intermediate, and front rail sections, pivot means interconnecting the rear and intermediate sections and having its axis directed inwardly rearwardly and downwardly of the body to provide for movement of portions of the front and intermediate rail sections outboard of the body as the top moves from raised to lowered positions, a transverse header member, and means connecting the header member to the side rails and permitting relative movement therebetween during such outboard movement of the side rail sections.

These and other objects, features and advantages of the invention will be readily apparent from the following specification and drawings wherein.

Figure 1:
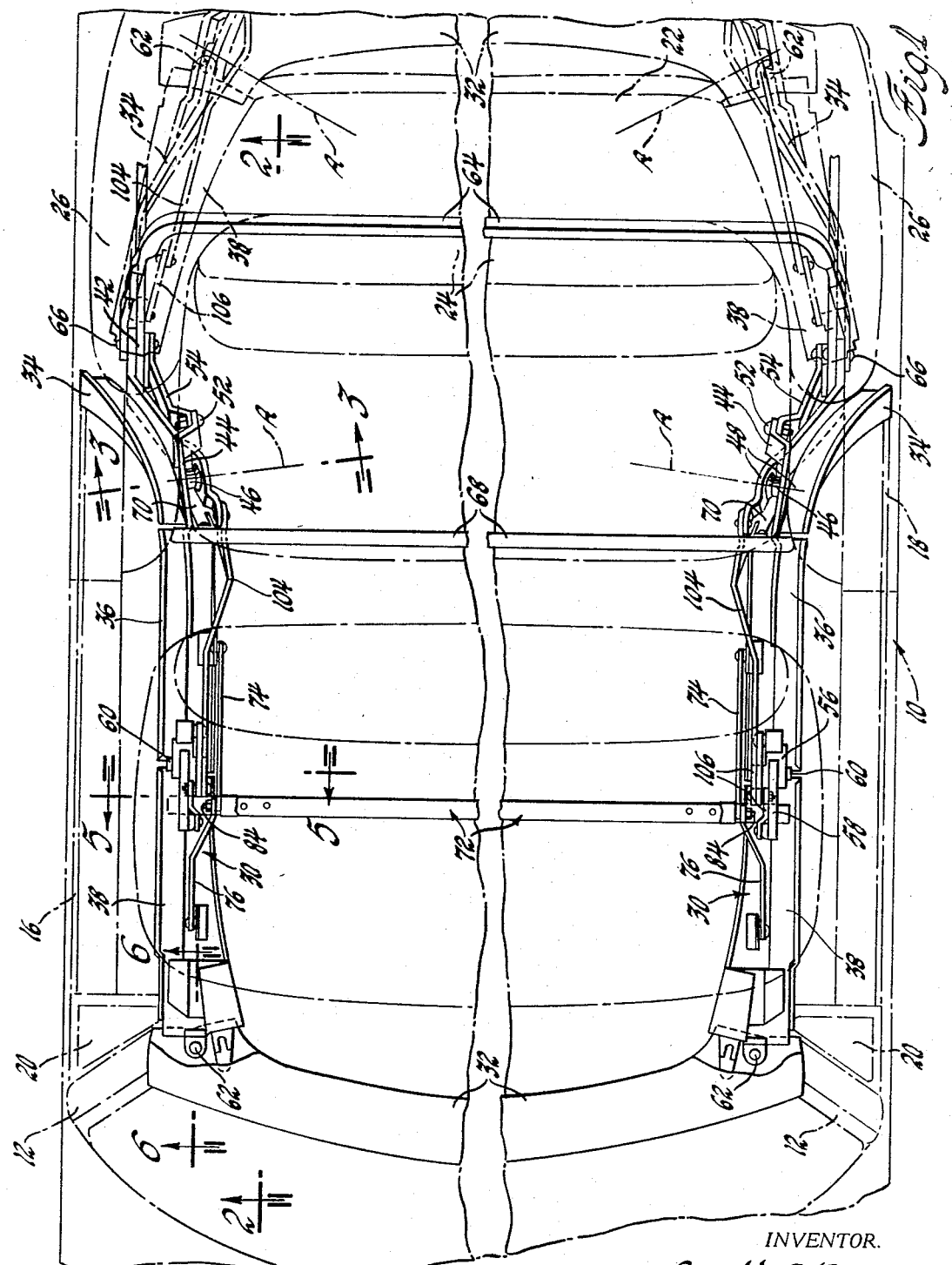
FIGURE 1 is a top plan view of a folding top frame structure according to this invention and showing the frame in raised and lowered positions in solid and broken lines respectively.
Figure 2:
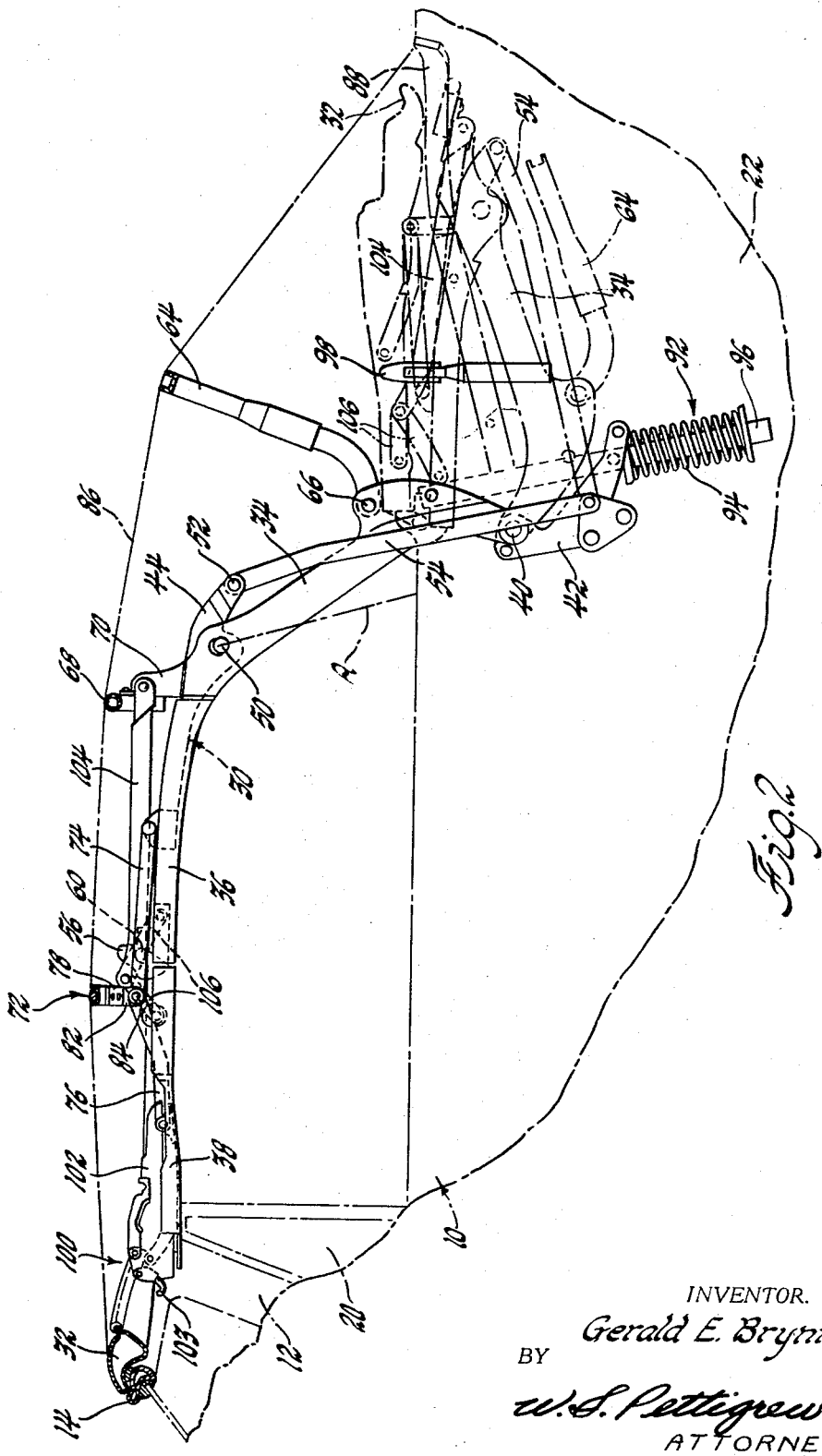
FIGURE 2 is a sectional view taken generally along the plane indicated by line 2—2 of FIGURE 1.

Referring now particularly to FIGURES 1 and 2 of the drawings, a convertible vehicle body shown in phantom lines is designated generally as 10, and includes a windshield supporting structure comprised of spaced generally upright pillars 12 and a transverse header member 14. Pillars 12 have a pronounced inward and rearward cant resulting in a relatively narrow transverse dimension to the header 14. Similarly, the side door and rear quarter glass at each side of the body have an inward curvature from the lower or belt line edge portions thereof, indicated by the lines 16 and 18, to the upper edge portions thereof, as do also the usual ventilation windows 20. Body 10 is further provided with a top receiving well 22 immediately rearward of the rear passenger seat, the seat back of which is indicated at 24. Opposite side or wing portions 26 of the well 22 flank the rear seat back and extend somewhat forwardly thereof to receive portions of the folding top as will later appear.

The folding top frame of this invention generally includes a pair of transversely spaced side rail assemblies 30 and a generally conventionally structured transverse header member 32 of a width conforming to that of windshield header 14 and adapted for operative engagement therewith by means later to be described. Each side rail assembly 30 includes serially arranged rear, intermediate and front side rail sections 34, 36 and 38. Each rear rail 34 is pivotally mounted adjacent the lower end thereof at 40 on a mounting bracket 42 which is suitably secured to the inner panel structure of the body. The axis of pivots 40 extend normal to longitudinally directed generally vertical planes of the body parallel to the center line plane thereof.

Figure 3:
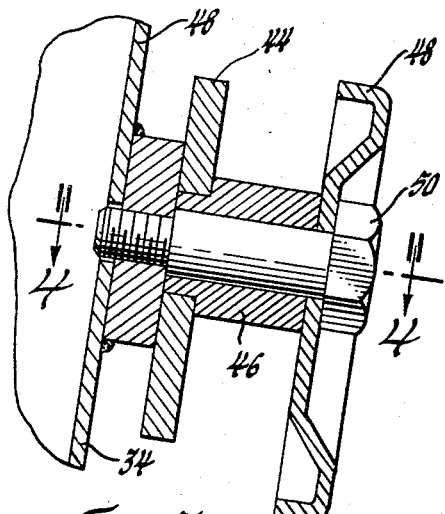
FIGURE 3 is an enlarged sectional view taken along the plane indicated by line 3—3 of FIGURE 1.
Figure 4:
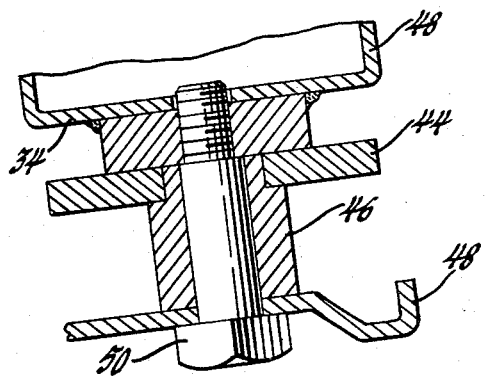
FIGURE 4 is a sectional view taken generally along the plane indicated by line 4—4 of FIGURE 3.
Figure 6:
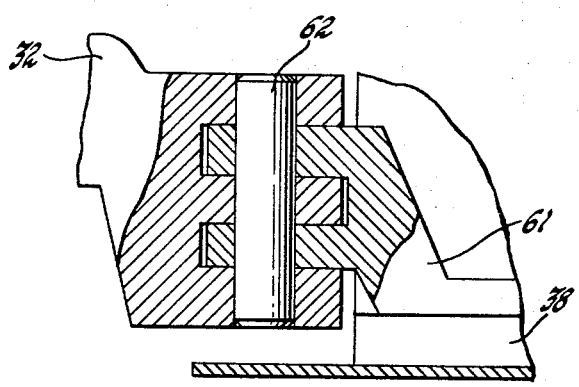
FIGURE 6 is an enlarged sectional view taken generally along the plane indicated by line 6—6 of FIGURE 1.

As seen in FIGURE 2, each rear rail 34 above the belt line of the body is canted or curved inwardly of the body to conform to the inward curvature of the rear quarter glass, and is generally channel-shaped in section substantially throughout this portion. Intermediate rail 36 is generally channel-shaped in section and includes a rearwardly extending arm portion 44 adapted for pivotal connection to the upper end of rear rail 34. As best seen in FIGURES 3 and 4, the arm 44 is bored to receive a reduced end of a bearing spacer 46 received between clevis portions 48 of the rear rail extreme upper end and secured thereto as by a bolt 50. Arm 44 is angled slightly inwardly downwardly from a vertical plane running longitudinally through intermediate rail 36, and of course is constrained to move in a plane normal to the bolt 50. The extreme rearward end of arm 44 has pivotal connection 52 with one end of a power link 54 pivotally secured at its other end to bracket 42. The forward end of intermediate rail 36 includes an upstanding bifurcated mounting flange 56 receiving a bored strap 58 within the rearward end of the channeled front rail 38, and a pivot stud 60 pivotally interconnects the two rail sections about an axis extending generally normal to a longitudinally directed vertical plane running therethrough. As seen in FIGURE 6, the forward end of each front rail 38 includes a bifurcated strap 61 pivotally received in a mounting portion of a respective end of header 32 and retained therein by a pin 62.

Figure 5:
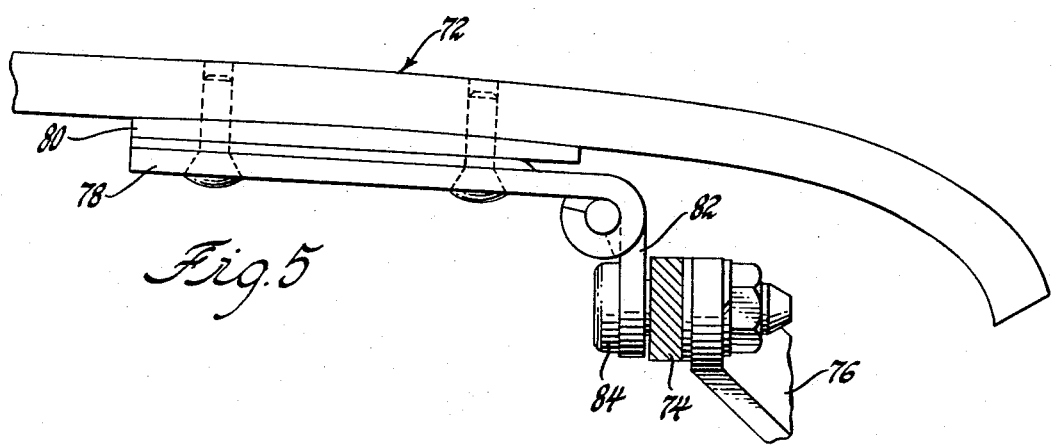
FIGURE 5 is an enlarged sectional view taken generally along the plane indicated by line 5—5 of FIGURE 1.

Referring to FIGURES 1 and 2, a rear bow 64 of conventional generally U-shaped construction has its opposite leg portions connected to respective rear rails 34 by pivot studs 66, and a No. 2 transverse bow 68 is similarly secured at either leg to upstanding portions 70 of the rear rails. A No. 1 bow assembly designated generally as 72 likewise extends transversely of the vehicle and has either end connected to a respective side rail assembly 30 by pairs of pivotally interconnected links 74 and 76 which are pivotally mounted respectively on intermediate and front rail 36 and 38. As seen best in FIGURE 5, the No. 1 bow proper has secured thereto at each end a first hinge strap 78 underneath a shim 80, and a second hinge strap 82 pivotally connected by a pin to strap 78. Strap 82 is bored to pivotally receive a mounting bolt 84 forming the pivot connection btween links 74 and 76.

The top fabric 86 has its forward edge suitably secured to a header 32, and extends rearwardly across bows 72, 68 and 64 to a rear tacking strip 88 mounted around the upper opening edge of well 22. In the raised position of the folding top, fabric 86 is taut along the outer edge portions of the side rails 30 and suitable tacking strip means are provided in bows 72 and 64 to insure proper folding of the fabric as the folding top moves to lowered position. In the event of any shrinkage in fabric 86 during use, shims 80 may be removed.

As particularly disclosed herein, the folding top frame is adapted for manual operation in its movement between raised and lowered position, and a counterbalance assembly designated generally as 92 is associated with the frame to aid such manual efforts applied thereto. Counterbalance assembly 92 is similar to that particularly described in Louton 3,177,034, issued Apr. 6, 1965 and assigned to the assignee of the present invention. Accordingly, a full description will not be repeated herein, but suffice it to say that the counterbalance assembly includes a coil compression spring 94 caged on an extensible linkage 96 in such manner that the spring urges the top to an intermediate or partially raised position. With this arrangement only minimal effort is required of the operator to move the top from this intermediate position either to the fully raised position or the fully folded position within the well 22. In order to hold the folding top in its lowered position against the action of the spring, suitable latching means 98 on the inner panel structure of the body are engageable with a portion of the folding top frame and are selectively manually releasable therefrom. For holding the folding top in raised position, there is provided a pair of header latches 100, one mounted on the forward end of each front rail 38 for cooperation with pin or suitable other striker means provided on windshield header 18. Latches 100 feature laterally swingable operating levers 102 for manipulating the latch bolts 103, and these operating levers stow in a concealed position within the channel of the front rail 38 when latched. The details of latches 100 may be fully understood upon reference to Heincelman, Ser. No. 264,867, filed Mar. 13, 1963.

Proceeding now to a description of the movement sequence of the folding top frame between raised and lowered positions, it is reiterated that, as seen in FIGURE 1, header 32 is of relatively narrow transverse dimension and the intermediate and front rails 36 and 38 of the spaced side rail assemblies 30 are similarly narrowly spaced of each other when in raised position. Were these front and intermediate rails to swing rearwardly purely in the longitudinally directed vertical planes of the body in which they are contained when in raised position, it is clear that they would severely limit the width of seat back 24 between the two wing portions 26 of well 22 which contain the side rails when in folded position.

To avoid such a condition, the pivotal axis between each set of rear and intermediate rails 34 and 36 through bolts 50 are canted inwardly rearwardly and downwardly of the body. In FIGURES 1 and 2, these axes are designated as A and in the embodiment disclosed herein, these axes are canted as much as 8° rearwardly of a transverse generally vertical plane through each bolt 50 and 35° downwardly of a transverse generally horizontal plane through the bolt. In moving from raised to lowered position, rear rails 34 swing about pivots 40 and the power links 54, by virtue of the parallelogram spacing of its pivots on the bracket 42 and on intermediate rails 36, cause relative folding movement of the intermediate rails toward the rear rails 34. Similarly, a connecting link 104 between portion 70 of each rear rails 34 and a set of parallelogram links 106 connected between the front and intermediate rails causes folding movement of the front rails over the intermediate rails as the rear rails proceed rearwardly.

It is to be noted that the pivot 52 between each power link 54 and arm 44 has its axis extending inwardly rearwardly and downwardly of the body parallel to axis A, as does also the pivotal connection of link 104 to portion 70. Rear rails 34, because of the directly transverse and horizontal attitude of the axes of pivots 40, swing at all points thereof in generally vertical longitudinally directed planes of the body. As seen, the front and intermediate rails 36 and 38 are located when in raised position generally in such a longitudinally directed vertical plane, running generally through the forward ends of rear rails 34. The pivots about bolt 50 move strictly within these two planes, but as the rear rails swing rearwardly, axes A therethrough are rotated about the transverse axes of pivots 40 until the rear rails reach the fully lowered position indicated in broken lines in FIGURE 2 whereat axes A are seen to have been reoriented to extend inwardly forwardly and slightly upwardly of the body. It is thus seen that as the intermediate rails 36 pivot about bolts 50 they are caused to be reoriented relative to the rear rails such that they extend forwardly and outwardly of the body from axis A when in lowered position, FIGURE 1. Pivots 60 between the front and intermediate rails require that the front rails and associated linkage fold directly over the intermediate rails in a common plane therewith to be likewise reoriented forwardly and outwardly of the body. The fixed length of header 32 requires that its end pivots 62 move strictly within longitudinal vertical planes of the body, but as the ends of front rails 38 at pivots 60 are caused to be moved outboard of the body and thus to effect an angular change between the front rails and the header, the pivot axes 60 are required and are provided to allow for such relative angular movement. The rear bow 64 moves with the rear rails 34 straight rearwardly in longitudinal planes of the body, as does the No. 2 bow. However, the No. 1 bow 72 has a transverse length fixed with respect to the spacing between the rear ends of the front rails 38 at pivots 60 when in raised position, so that accommodation must be made for the change in this relation as these front rail ends move outboard of the body toward folded position. This is accomplished by hinges 78, 82 between bow 72 and the links 74, 76, in that the scissors action of the links obtaining as the side rail sections are folded results in a rearward displacement of the bow relative to the pivots 60 such that the ends of the bow at pivot connections 84 are not subject to the pronounced outboard movement of the front and intermediate rails; that is, these pivots 84 move rearwardly in longitudinal vertical planes of the body. However, in the folded position of the frame, the links 74 and 76 are reoriented with the side rails at an outboard angle relative to these planes and the hinges 78, 82 are provided to accommodate such angularity.

The overall result is clearly seen in broken lines in FIGURE 1. When the folding top is fully folded into well 22, the connected ends of the front and intermediate rails adjacent pivots 60 flank the rear seat back 24 while within wing portions 26. These portions of the rails however have been caused to move outboard of the planes in which they were located to conform to the windshield header and side glass environment when in raised position. Thus, the rear seat back is allowed to be of a maximum width free of any dictates by such environment.

Thus a new and improved folding top frame structure is provided.

I claim:

1. In combination with a convertible vehicle body, folding top frame structure comprising, a foldable side rail disposed to a respective side of said body and being movable between raised and lowered positions, said side rail including a pair of rail sections, first means mounting one of said rail sections on said body for movement in a generally vertically disposed plane directed longitudinally of said body, and second means mounting the other rail section on said one rail section for movement therewith and movement relative thereto, said other rail section being located in said plane in the raised position of said side rail, said second mounting means moving said other rail section relative to said one rail section and generally outboard of said plane as said side rail moves to the lowered position thereof.

2. In combination with a convertible vehicle body, folding top frame structure comprising, a foldable side rail disposed to a respective side of said body and being movable between raised and lowered positions, said side rail including a pair of rail sections, first pivot means swingably mounting one of said rail sections on said body for movement in a generally vertically disposed plane directed longitudinally of said body, and second pivot means pivotally connecting the other rail section to said one rail section for movement therewith and swinging movement relative thereto, said second pivot means having its axis disposed at a compound angle to a normal to said plane, said other rail section being located in said plane in the raised position of said side rail, said second pivot means moving said other rail section relative to said one rail section and generally outboard of said plane as said side rail moves to the lowered position thereof.

3. In combination with a convertible vehicle body, folding top frame structure comprising, a foldable side rail disposed to a respective side of said body and being movable between raised and lowered positions, said side rail including a rear rail section and a forward rail section, first pivot means swingably mounting one end of said rear rail section on said body for movement in a generally vertically disposed plane directed longitudinally of said body, and second pivot means pivotally connecting said forward rail section to the other end of said rear rail section for movement therewith and swinging movement relative thereto, said second pivot means having its axis disposed at predetermined slight angles inwardly rearwardly and downwardly of said body to a normal to said plane when in said raised position, said forward rail section being located in said plane in the raised position of said side rail, said second pivot means moving said forward rail section relative to said rear rail section and generally outboard of said plane as said side rail moves to the lowered position thereof.

4. Folding top frame structure as recited in claim 3 and further including a transverse header member, and means pivotally interconnecting one end of said member with said forward rail section.

5. In combination with a convertible vehicle body, folding top frame structure comprising, a foldable side rail disposed to a respective side of said body and being movable between raised and lowered positions, said side rail including rear, intermediate and front side rail sections, first pivot means mounting one end of said rear rail section on said body for movement in a generally vertically disposed plane directed longitudinally of said body, second pivot means pivotally connecting the rearward end of said intermediate rail section to the other end of said rear rail section for movement therewith and swinging movement relative thereto, said second pivot means having an axis disposed at predetermined slight angles inwardly rearwardly and downwardly of said body to a normal to said plane when in said raised position, third pivot means pivotally connecting the forward end of said intermediate rail section and the rearward end of said front rail section and having its axis disposed generally normal to said plane, said front and said intermediate rail sections being located in said plane in the raised position of said side rail, said second pivot means swinging said front and said intermediate rail sections relative to said rear rail section and moving the portions thereof adjacent said third pivot means outboard of said plane as said side rail moves to the lowered position thereof, a transverse header member, and further pivot means pivotally connecting one end of said header member to the forward end of said front rail section for relative movement therebetween during movement of said side rail between said positions thereof.

6. Folding top frame structure as recited in claim 5, and further including a transverse bow member, and means movably mounting said bow member on said side rail adjacent said third pivot means and permitting movement of said bow member transversely thereof during movement of said side rail between said positions thereof.

References Cited by the Examiner

UNITED STATES PATENTS

| | | | |
|---|---|---|---|
| 2,768,857 | 10/1956 | Albrecht | 296—117 |
| 2,860,913 | 11/1958 | Kuider et al. | 296—107 |
| 2,897,003 | 7/1959 | Lelli et al. | 296—117 |
| 3,177,034 | 4/1965 | Louton | 296—117 |

BENJAMIN HERSH, *Primary Examiner.*

C. C. PARSONS, *Assistant Examiner.*